Patented Oct. 9, 1928.

1,687,036

UNITED STATES PATENT OFFICE.

ESKEL NORDELL, OF FORT WAYNE, INDIANA, ASSIGNOR, BY MESNE ASSIGNMENTS, TO THE PERMUTIT COMPANY, OF NEW YORK, N. Y., A CORPORATION OF DELAWARE.

BASE EXCHANGE SILICATE AND PROCESS OF MAKING SAME.

No Drawing.      Application filed November 21, 1925. Serial No. 70,694.

My invention relates to processes of producing uniform colloidal alkali metal amphoteric metallo silicate gels and the products obtained by partially drying such gels and then disintegrating the resultant product.

In wet methods of producing base exchange silicates for water-softening and similar purposes, a solution of an alkali silicate is brought into reaction with a solution of a suitable metal compound; usually an aluminum compound. Much of the physical nature of the final product depends upon the way in which reaction is effected. Gels are formed and these may range from flocculent precipitates to jellies. In processes of this nature I have found that gels of uniform and desirable nature may be produced by using as the metal salt one containing an organic acid.

Heretofore great difficulty has been experienced in this art in producing gels of uniform consistency throughout, due to the fact that unless the strictest conditions of temperature control were maintained, solid material tended to precipitate out, instead of forming good and uniform gels.

It has also been difficult with the former methods of procedure to use fairly strong solutions in making a gel. This necessitated considerably more trouble and expense to evaporate off the extra amount of water from the product.

I have found that a precipitation of the material occurs, or tends to occur, when strongly ionized salts, such as sodium chloride or sodium sulphate, are present. However, when the salt of an organic acid is present instead, it does not ionize as strongly and consequently does not exert as great a precipitating tendency. It is, therefore, possible by my new method to control the gel formation much more exactly and obtain a much more uniform gel, and these are objects of my invention.

On account of the fact that the sodium salts of organic acids formed by the reactions taking place by my method, are weakly ionized, it is not necessary to exercise as strict a temperature control as that required in the use of other methods, and it is also easier to mix the two solutions uniformly prior to gel formation.

The gel formed in the present method is much more uniform in composition and the resultant base exchange silicate that is formed from this gel is a superior product because of its uniform composition and physical structure as compared to base exchange silicates made from gels where an amphoteric metal salt of an inorganic acid has been used.

Heretofore in the manufacture of base exchange silicates the desirability of having only weakly ionized salts present has not been recognized. In fact strongly ionized salts, such as sodium sulphate, have sometimes been added to the mix in wet methods of making base exchange silicates.

Directly contrary to this practice, I have endeavored to eliminate as completely as possible all strongly ionized salts from the mix used in forming the gel. The reason for employing amphoteric metal salts of organic acids is because such salts of organic acids as are formed during the reaction are ionized only very slightly and consequently do not exert the graining or precipitating tendencies of strongly ionized salts of inorganic acids.

Other objects of my invention are to produce a base exchange silicate of high exchange capacity, of great porosity, and of great structural strength; and to ensure uniformity of these qualities in the product.

Coming now to the consideration of the materials used, namely: alkali silicate and an amphoteric metal salt of an organic acid. As a common example of a suitable alkali silicate, ordinary water glass, which is a 40° Bé. solution of sodium silicates, usually having a soda to silica ratio of 1 $Na_2O$ to 3.25 $SiO_2$, may be cited. Silicate of soda is however made in various commercial grades in which the proportions of $Na_2O$ to $SiO_2$ may vary greatly. Sodium silicate with greater ratios of $Na_2O$ to $SiO_2$ than 1 to 3.25 may be easily made by adding the desired amount of caustic soda to the ordinary 1 to 3.25 sodium silicate.

In carrying my invention into practice I use what I now consider to be a preferred formula and method of procedure. I make up a batch of 326 liters of solution A, which consists of 269 liters $\frac{N}{2}$ aluminum acetate (34.03 grams per liter) and 57 liters of water. I then mix up a batch consisting of 326 liters of solution B, consisting of 150 liters N-sodium silicate (31 grams $Na_2O$ and approximately 98 grams $SiO_2$ per liter), 66 liters N-caustic soda (40.01 grams per liter), and 110 liters of water. The quantities given indicate proportions and make a batch of convenient size. These solutions can be used at temperatures approximating room temperature or below. I bring A and B into contact with each other with rapid admixture by running them separately through two pumps geared on the same shaft, each delivering the same amount of liquid, and these two liquids are delivered into one mixing funnel, each liquid being delivered through a series of holes into the funnel rim, the two series of holes being so arranged as to have streams of the two liquids entering simultaneously through alternate holes in the funnel rim. The mixed solutions pass from the funnel into shallow open-top receptacles or pans which are filled to a suitable height. In about five to seven minutes the mix gels to a jelly. The time of gellation can be varied by slightly changing the strength of the solutions used; also by changing the temperature. In general the more dilute the solutions and the lower their temperature, the longer the time required for gellation.

The jelly is of substantially uniform consistency throughout and is allowed to stand, or age, for from twenty-four to forty-eight hours after which time it is dried at a heat not to exceed 170° F. After the gel has been dried to a point where the product contains about fifty per cent moisture, at which time it has broken up into irregularly sized chunks usually not to exceed in any diameter more than three to four inches, these chunks are dropped into water which causes them to break up into pieces none of which are generally larger than a grain of corn. These pieces are now further subdivided by grinding in a mill to proper size and particles which are larger than eight mesh are reground and those smaller than forty mesh are preferably rejected. After being thoroughly leached the resulting comminuted product is then ready for use in an ordinary water softener of the pervious bed type or any convenient apparatus.

As a common example of an amphoteric metal salt of an organic acid, aluminum acetate may be cited. In using aluminum acetate I have successfully used a solution which was made fresh by metathesis and was practically free from other salts.

I have found that the preferable method of making the aluminum salt of an organic acid is by metathesis in solution. Thus to make a solution, for instance, of aluminum acetate, I mix a solution of barium acetate with the required quantity of a solution of aluminum sulphate, the reaction producing a solution of aluminum acetate and an insoluble precipitate of barium sulphate. Of course aluminum acetate made by other methods may be used, and also aluminum salts of other organic acids.

I have found that it is quite necessary to have this solution of aluminum acetate substantially free from any content of free carbon dioxide as its presence tends to prevent the formation of a uniform gel.

I am well aware of the fact that base exchange silicates have been made by wet processes heretofore and that a number of patents on such processes have been issued. In these patents as a source of amphoteric metal either amphoteric metal salts of inorganic acids or alkali amphoterates, such as sodium aluminate, are used, and my process uses none of these compounds.

I have found that in the formation of these base exchange silicates amphoteric metal salts of organic acids when reacting with alkali silicates do not produce by-products which have a strong graining or precipitating action upon the colloidal base exchange silicates, and that by my process it is possible to produce smooth gels of definite composition.

It will be understood that variations in the formula and method here outlined may be used with more or less success and all such modifications are contemplated in connection with this disclosure and are claimed as within the scope of my invention.

I claim as my invention and desire to secure by Letters Patent of the United States:

1. The process of making a base exchange silicate gel, consisting of mixing a solution of a soluble aluminum salt of an organic acid with a solution of an alkali metal silicate, and allowing said solutions to react.

2. The process of making base exchange silicates, consisting of mixing a solution of a soluble aluminum salt of an organic acid with a solution of an alkali metal silicate, allowing said solutions to react, and partially drying the resultant gel.

3. The process of making base exchange silicates, consisting of mixing a solution of a soluble aluminum salt of an organic acid with a solution of an alkali metal silicate, allowing said solutions to react, partially drying the resultant gel, and leaching and grading said product to size.

4. The process of making a base exchange silicate gel, consisting of mixing a solution of aluminum acetate with a solution of an alkali metal silicate and allowing said solutions to react.

5. The process of making base exchange silicates, consisting of mixing a solution of aluminum acetate with a solution of an alkali metal silicate allowing said solutions to react, and partially drying the resultant gel.

6. The process of making base exchange silicates, consisting of mixing a solution of aluminum acetate with a solution of alkali metal silicate, allowing said solutions to react, partially drying the resultant gel, and leaching and grading said product to size.

7. Base exchange silicates resulting from the reaction of a solution of a soluble aluminum salt of an organic acid with a solution of an alkali metal silicate, said gel product partially dried, leached, broken up and screened to size for use.

8. Base exchange silicates resulting from the reaction of a solution of aluminum acetate with a solution of an alkali metal silicate, said gel product partially dried, leached, broken up and screened to size for use.

In testimony whereof I have hereunto set my hand.

ESKEL NORDELL.